US012247439B2

(12) United States Patent
Schroeder et al.

(10) Patent No.: US 12,247,439 B2
(45) **Date of Patent: *Mar. 11, 2025**

(54) COVERING FOR AN ARCHITECTURAL FEATURE HAVING A BOTTOM RAIL LEVELING MECHANISM

(71) Applicant: Hunter Douglas Inc., New York, NY (US)

(72) Inventors: Max W. Schroeder, Broomfield, CO (US); Kenneth M. Faller, Thornton, CO (US)

(73) Assignee: HUNTER DOUGLAS INC., New York, NY (US)

( * ) Notice: Subject to any disclaimer, the term of this patent is extended or adjusted under 35 U.S.C. 154(b) by 504 days.

This patent is subject to a terminal disclaimer.

(21) Appl. No.: 17/574,226

(22) Filed: Jan. 12, 2022

(65) Prior Publication Data

US 2022/0136324 A1 May 5, 2022

Related U.S. Application Data

(62) Division of application No. 15/994,371, filed on May 31, 2018, now Pat. No. 11,274,492.

(Continued)

(51) Int. Cl.
*E06B 9/34* (2006.01)
*E06B 9/322* (2006.01)
(Continued)

(52) U.S. Cl.
CPC .............. *E06B 9/322* (2013.01); *E06B 9/323* (2013.01); *E06B 9/34* (2013.01); *E06B 2009/2435* (2013.01)

(58) Field of Classification Search
CPC .... E06B 2009/2435; E06B 9/34; E06B 9/322; E06B 9/323; E06B 9/44; E06B 9/46; E06B 9/42; E06B 2009/2423; E06B 9/40
See application file for complete search history.

(56) References Cited

U.S. PATENT DOCUMENTS 2,267,869 A 12/1941 Loehr
4,088,171 A 5/1978 Schluep et al.
(Continued)

FOREIGN PATENT DOCUMENTS

CN 103517656 A 1/2014
CN 105074114 A 11/2015
(Continued)

OTHER PUBLICATIONS

English-language translation of a Japanese Office Action dated Jan. 18, 2022, received in a corresponding foreign application, 3 pages.
(Continued)

*Primary Examiner* — Johnnie A. Shablack
*Assistant Examiner* — Jeremy C Ramsey
(74) *Attorney, Agent, or Firm* — Scully, Scott, Murphy & Presser, P.C.

(57) ABSTRACT

A covering system for an architectural feature having a roller, the roller including a main body portion and a flapper portion pivotable relative to the main body portion. The covering system also includes a first support member operatively associated at one end to the main body portion and at a second end to a bottom rail, as well as a second support member operatively associated with and laterally moveable relative to the first support member, wherein a first end of the second support member is operatively associated with the flapper portion and a second end of the second support member is operatively associated with the bottom rail. The covering system also includes a limiting mechanism configured to interact with the flapper portion of the roller to maintain the bottom rail in a horizontally level position as the second support member is moved laterally with respect to the first support member.

19 Claims, 12 Drawing Sheets

Related U.S. Application Data

(60) Provisional application No. 62/513,620, filed on Jun. 1, 2017.

(51) Int. Cl.
*E06B 9/323* (2006.01)
*E06B 9/24* (2006.01)

(56) References Cited

U.S. PATENT DOCUMENTS

| | | | | |
|---|---|---|---|---|
| 5,320,154 | A | 6/1994 | Colson et al. | |
| 6,237,667 | B1 | 5/2001 | Fraczek et al. | |
| 9,260,914 | B2 | 2/2016 | Certain et al. | |
| 9,290,974 | B2 | 3/2016 | Alexander | |
| 9,328,555 | B2 | 5/2016 | Faller et al. | |
| 9,359,813 | B2 * | 6/2016 | Colson | E06B 9/34 |
| 9,739,089 | B2 | 8/2017 | Smith | |
| 9,909,361 | B2 | 3/2018 | Buccola, Jr. et al. | |
| 9,963,935 | B2 | 5/2018 | Faller | |
| 9,995,083 | B2 | 6/2018 | Colson et al. | |
| 2005/0247410 | A1 * | 11/2005 | Nien | E06B 9/48 160/84.04 |
| 2014/0262069 | A1 | 9/2014 | Drew et al. | |

FOREIGN PATENT DOCUMENTS

| | | | |
|---|---|---|---|
| CN | 105378205 | A | 3/2016 |
| DE | 202014101172 | U1 | 7/2014 |
| EP | 0494501 | B1 | 6/1996 |
| GB | 1550582 | A | 8/1979 |
| JP | H4-269282 | A | 9/1992 |
| JP | H5-106384 | A | 4/1993 |
| JP | H0673970 | A | 3/1994 |
| JP | 2002-322880 | A | 11/2002 |
| JP | 2016069906 | A | 5/2016 |
| NO | 200102688 | A1 | 1/2001 |
| TW | 201508159 | A | 3/2015 |
| WO | 2006098853 | A2 | 9/2006 |
| WO | 2014151974 | A1 | 9/2014 |
| WO | 2014160434 | A1 | 10/2014 |
| WO | 2016040646 | A1 | 3/2016 |

OTHER PUBLICATIONS

Search Report From Related Applcation, GB 1808808.8 Dated Apr. 17, 2019, 8 Pages.

* cited by examiner

COVERING FOR AN ARCHITECTURAL FEATURE HAVING A BOTTOM RAIL LEVELING MECHANISM

CROSS-REFERENCE TO RELATED APPLICATIONS

This application claims priority to U.S. patent application Ser. No. 15/994,371, filed May 31, 2018, which claims the benefit of U.S. Provisional Application No. 62/513,620, filed Jun. 1, 2017, each of which is incorporated herein by reference in its entirety.

FIELD OF THE INVENTION

The present disclosure relates to coverings for architectural features, which may include windows, doorways, archways and the like, and related systems and methods of operation and manufacture. More particularly, the present disclosure relates to a covering for architectural features including roll-up type window coverings having first and second generally parallel support members whose movement is controlled by movement of a rotatable tube or roller, and a mechanism or assembly for controlling the movement and positioning of the support members.

BACKGROUND OF THE INVENTION

Current coverings for architectural features include sheer shadings sold under the brand name SILHOUETTE® by Hunter Douglas, as well as those described in U.S. Pat. No. 5,313,999 and/or U.S. published patent application No. 2014/0138037, each of which are incorporated by reference herein in their entirety. Such coverings use generally vertical first and second support elements supporting a plurality of generally horizontal, substantially flexible vane elements. The vertical support elements are often formed of flexible, sheer panels, but may be other support structures, such as one or more tapes, strips, etc. The vertical support elements and the substantially horizontal, flexible vanes together form a flexible or soft light-controlling window covering or panel. The flexible nature of the SILHOUETTE® covering permits it to be operated by rolling and unrolling the flexible light-controlling panel about a roller, and may be referred to as a roll-up type covering.

At least one of the first and second support elements of the covering is coupled to a bottom rail member, with the bottom rail member generally extending across the width of the covering to form a weighted end for the first and/or second support elements opposite the roller. When the covering is drawn from the roller to a fully-extended, closed position, the flexible vanes are generally in a closed position, and as the covering is operated to a fully extended, open position where the flexible vanes move into an open position, the two generally parallel support members laterally separate. As the vertical members laterally separate generally by further rotation of the roller, one of the support members generally drops down as it separates and moves laterally away from the other support member, and then that support member lifts back up as the coupling location of the support member traces the arc of the roller tube. This vertical movement of the support member in a down and then back up motion may have some undesirable effects. For example, this movement of the support member may cause undesirable movement of the bottom rail. For example, the bottom rail in the fully-extended closed position is preferably located at, near, or in contact with a bottom portion of the architectural feature (e.g., a window sill). In this way, little to no light passes through or around the covering, including below the bottom rail member. Further rotation of the roller at the fully-extended position may act to open the flexible vanes so as to allow at least some light to pass through the covering. However, such further rotation of the roller may also act to displace at least a portion of the bottom rail member upward and away from the bottom portion of the architectural feature (e.g., a windowsill), thereby pulling the bottom rail member up and possibly allowing light to pass beneath the bottom rail member.

Therefore, it may be desirable to have a covering for an architectural feature having a bottom rail member capable of maintaining level alignment (e.g., a relatively constant height) at various fully-extended positions.

SUMMARY OF THE INVENTION

The present disclosure is directed to a person of ordinary skill in the art. The purpose and advantages of the architectural covering and leveling mechanism (which controls the movement of at least one of a support member) will be set forth in, and be apparent from, the drawings, description, and claims that follow. The summary of the disclosure is given to aid understanding of the covering and the leveling mechanism, and it should be understood that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be utilized separately, or in combination with aspects and features of that embodiment or any other embodiment. In accordance with the present disclosure, variations and modifications may be made to the architectural covering and/or leveling mechanism to achieve different effects.

At least one aspect of the present disclosure is directed to a covering system for an architectural feature wherein a bottom rail coupled to at least one of respective first and second support members of the covering system is held level and steady with respect to a bottom surface of the architectural feature when the support members have reached a fully-extended position and the support members are laterally moved away and separated from one another to "open" the covering. Such a configuration prevents undesirable vertical movement of the bottom rail as the support members are transitioned from a fully-extended "closed" position to a fully-extended "open" position.

In accordance with one aspect of the disclosure, a covering system includes a rotatable roller having a main body portion and a flapper portion, wherein the flapper portion is pivotably associated with the main body portion at one end of the flapper portion. The covering system also includes a first support member having a height and width, wherein one end of the first support member is operatively associated with the main body portion of the roller, as well as a second support member having a height and a width, wherein the second support member is substantially parallel to the first support member and operatively associated with and laterally moveable relative to the first support member, wherein a first end of the second support member is operatively associated with the flapper portion of the roller and a second end of the second support member is operatively associated with a bottom rail. The covering system further includes a limiting mechanism configured to interact with the flapper portion of the roller to maintain the bottom rail in a horizontally level position as the second support member is moved laterally with respect to the first support member.

In accordance with another aspect of the disclosure, a covering system includes a rotatable roller having a main body portion and a flapper portion, wherein the flapper portion is pivotable relative to the main body portion, and further wherein the flapper portion has a projection extending laterally therefrom. The covering system also includes a first support member, wherein one end of the first support member is operatively associated with the main body portion of the roller, and a second support member, wherein the second support member is associated with the roller and in an extended position is configured to be substantially parallel to the first support member, the second support member is operatively associated with and laterally moveable relative to the first support member, wherein one end of the second support member is operatively associated with the flapper portion of the roller. The control system further includes a track, wherein the projection extending from the flapper portion is configured to be guided along the track so as to control the angular orientation of the flapper portion as the roller is rotated.

In accordance with another aspect of the disclosure, a covering system includes a rotatable roller having a main body portion and a flapper portion, wherein the flapper portion is pivotable relative to the main body portion, a first support member, wherein one end of the first support member is operatively associated with the main body portion of the roller, and a second support member, wherein the second support member is associated with the roller to be substantially parallel to the first support member in an extended position and operatively associated with and laterally moveable relative to the first support member, wherein one end of the second support member is operatively associated with the flapper portion of the roller. The covering system also includes a non-rotatable cam mechanism having at least one centrally-offset cam surface, the non-rotatable cam mechanism disposed within the rotatable roller, a cam housing rotatably associated with the non-rotatable cam mechanism, wherein the cam housing is further operatively associated with and rotatable by the rotatable roller, and a flexible strap having a first end and a second end, wherein the flexible strap is coupled at the first end to the cam housing and coupled at the second end to the flapper portion of the roller.

According to another aspect of the disclosure, a leveling mechanism for a covering element is disclosed. The leveling mechanism includes a rotatable roller having a main body portion and a flapper portion, wherein the flapper portion is pivotable relative to the main body portion, and further wherein the flapper portion has a projection extending laterally therefrom. The leveling mechanism also includes a track, preferably a protruding track, wherein the projection extending from the flapper portion is configured to interact with the track so as to control the angular orientation of the flapper portion as the roller is rotated.

In accordance with another aspect of the disclosure, a leveling mechanism for a covering element is disclosed, wherein the leveling mechanism includes a rotatable roller having a main body portion and a flapper portion, wherein the flapper portion is pivotable relative to the main body portion, and a non-rotatable cam mechanism having at least one centrally-offset cam surface, the non-rotatable cam mechanism disposed within the rotatable roller. The leveling mechanism also includes a cam housing rotatably coupled to the non-rotatable cam mechanism, wherein the cam housing is further coupled to and rotatable by the rotatable roller. The leveling mechanism includes a flexible strap having a first end and a second end, wherein the flexible strap is coupled at the first end to the cam housing and coupled at the second end to the flapper portion of the roller.

These and other features and advantages of the covering will be readily apparent from the following detailed description, with the scope of the invention being set out in the appended claims. The summary of the disclosure is given to aid understanding, and is directed to one of ordinary skill in the art who should understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be utilized or claimed separately, or in combination with aspects and features of that embodiment or any other embodiment.

In addition, the present disclosure is set forth in various levels of detail in this application and no limitation as to the scope of the claimed subject matter is intended by either the inclusion or non-inclusion of elements, components, or the like in this summary. For example, while some embodiments refer to a control system including a track and a flapper portion with a projection, it will be appreciated that the control mechanism may have the projection and the flapper portion may be configured with a track. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

The various aspects, features and embodiments of the architectural covering as disclosed herein will be better understood when read in conjunction with the drawings provided. Embodiments are provided in the drawings for the purposes of illustrating aspects, features and/or various embodiments of the architectural covering, but the claims should not be limited to the precise arrangement, structures, subassemblies, features, embodiments, aspects, and devices shown, and the arrangements, structures, subassemblies, features, embodiments, aspects, and devices shown may be used singularly or in combination with other arrangements, structures, subassemblies, features, embodiments, aspects, and devices. The drawings are not necessarily to scale and are not in any way intended to limit the scope of the claims, but are merely presented to illustrate and describe various embodiments, aspects and features of the architectural covering to one of ordinary skill in the art.

DETAILED DESCRIPTION OF THE INVENTION

Figure 1A:
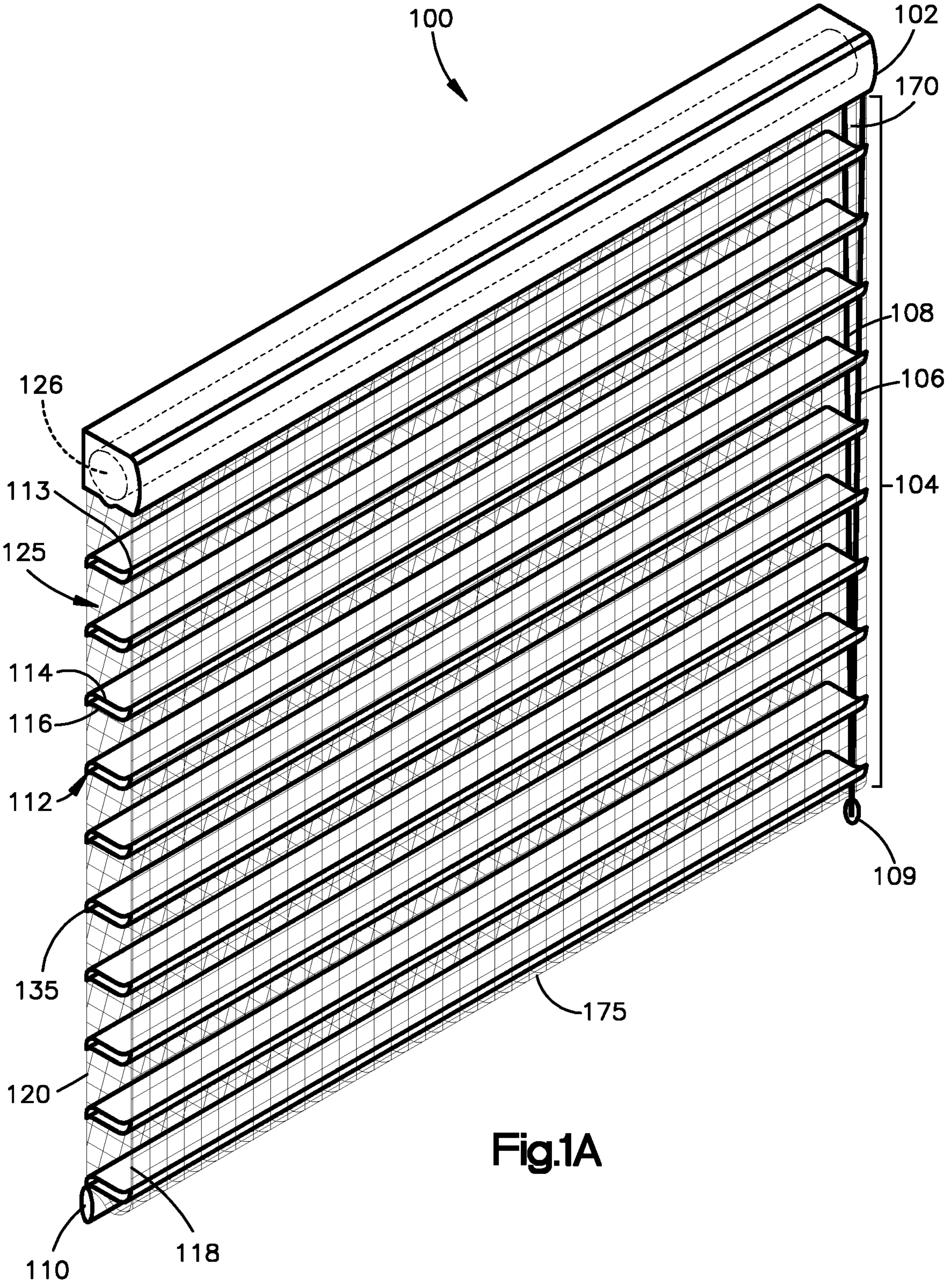
FIG. 1A is a perspective view of one embodiment of a covering system for an architectural feature in a fully-extended position.

In the following detailed description, numerous details are set forth in order to provide an understanding of an architectural covering and the various leveling mechanisms, their method of operation, and method of manufacture. However, it will be understood by those skilled in the art that the different and numerous embodiments of the architectural covering, and leveling mechanism, their method of operation and manufacture may be practiced without these specific details, and the claims and invention should not be limited to the embodiments, subassemblies, or the specified features or details specifically described and shown herein. The description provided herein is directed to one of ordinary skill in the art and in circumstances, well-known methods, procedures, manufacturing techniques, components, and assemblies have not been described in detail so as not to obscure other aspects, or features of the architectural covering and/or leveling mechanism.

Accordingly, it will be readily understood that the components, aspects, features, elements, and subassemblies of the embodiments, as generally described and illustrated in the figures herein, can be arranged and designed in a variety of different configurations in addition to the described embodiments. It is to be understood that the covering and leveling mechanism may be used with many additions, substitutions, or modifications of form, structure, arrangement, proportions, materials, and components which may be particularly adapted to specific environments and operative requirements without departing from the spirit and scope of the invention. The following descriptions are intended only by way of example, and simply illustrate certain selected embodiments of an architectural covering and leveling mechanism. For example, while the architectural covering is shown and described in examples with particular reference to its use as a window covering to control light and view-through, it should be understood that the covering may have other applications as well. The claims appended hereto will set forth the claimed invention and should be broadly construed to cover architectural coverings and/or leveling mechanisms, unless otherwise clearly indicated to be more narrowly construed to exclude embodiments, elements and/or features of the covering and/or leveling mechanism.

Throughout the present application, reference numbers are used to indicate a generic element, mechanism, assembly, or feature of the covering and/or leveling mechanism. The same reference number may be used to indicate element, mechanisms, assemblies, or features that are not identical in form, shape, structure, etc., yet which provide similar functions or benefits. Additional reference characters (such as letters, primes, or superscripts, as opposed to numbers) may be used to differentiate similar elements or features from one another. It should be understood that for ease of description the disclosure does not always refer to or list all the components of the covering, and/or leveling mechanism, and that a singular reference to an element, member, or structure, e.g., a singular reference to a generally support member, may be a reference to one or more such elements, unless the context indicates otherwise.

In the following description of various embodiments of the architectural covering, and/or leveling mechanism it will be appreciated that all directional references (e.g., proximal, distal, upper, lower, upward, downward, left, right, lateral, longitudinal, front, rear, back, top, bottom, above, below, vertical, horizontal, radial, axial, interior, exterior, clockwise, and counterclockwise) are only used for identification purposes to aid the reader's understanding of the present disclosure unless indicated otherwise in the claims, and do not create limitations, particularly as to the position, orientation, or use in this disclosure. Features described with respect to one embodiment typically may be applied to another embodiment, whether or not explicitly indicated.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and/or in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The present disclosure in one aspect relates to coverings for architectural features, which include, for example, windows, door frames, archways, and the like, and may provide an aesthetic look, as well as desirable shading and privacy. The coverings generally comprise a flexible subassembly or panel that may include one or more moveable first and second support members. The first and second support members may be substantially any type of material, and are preferably formed from flexible materials, such as, but not limited to, textiles, fabrics, and films, including knits, wovens, non-wovens, etc. The support members may include, for example, sheets, panels, tapes, strips, or the like, and combinations of these elements. Each support member may be formed of a single integrated piece, or multiple piece(s), of material, and may be substantially flat and planer.

The support members have a height (length), width, and thickness, and their thickness (generally perpendicular to their height and width) may be relatively thin. The support members generally are made of materials that are much thinner than their respective length (height) and/or width. The "height" of the support members, also referred to as the "length", generally and typically corresponds to and is associated with the height or vertical dimension of the covering. The width of the support members in one embodiment generally and typically corresponds to the width of the covering. The width of the support members may or may not extend the width of the covering and may comprise multiple tapes of material.

The support members in a retracted position typically are wrapped around a roller or tube, and in an extended position generally hang from the roller tube in a generally vertical and parallel manner. In one embodiment, the support members 118, 120 may have no fold lines, creases, loops of material, or the like.

In one embodiment, the panel may include one or more vane elements extending between the support members. In one embodiment, the vane elements preferably have a different light transmissivity or translucence than the support members, and the vanes and support members together control view-through and light transmission through the covering. In one embodiment, the first and second supporting members are sheers and/or materials that permit light to pass therethrough, and the vane elements are translucent, semi-opaque, opaque, and/or room-darkening materials or combinations thereof. While the drawing and disclosure refer to the panel as having vane elements, it will be appreciated that the panel is not limited to such a construction and does not require vane elements.

Referring to FIGS. 1A-1D, a covering 100 generally includes a headrail 102, a roller 126 associated with (and rotatably housed within) the head rail 102, a panel 104, a bottom rail 110, and a control mechanism 106 to operate the covering 100 (e.g., a mechanism to rotate the roller 126). The control mechanism 106 may be configured to regulate movement of the panel 104. In one embodiment, the roller 126 supports and is connected to a top end 170 of panel 104, and bottom rail 110 is connected to a bottom end 175 of panel 104.

Head rail 102 may support the roller 126, and the panel 104 may be coupled to roller 126 over or within an architectural feature, such as a window, doorway, etc. Thus, head rail 102 may generally correspond to the shape and dimensions (e.g., width) of the top of the architectural feature. In one embodiment, the first and second support members 118, 120 are coupled directly or indirectly to the roller 126, and preferably at different horizontally-extending locations along the circumference of the roller 126 to provide lateral movement of the first and second support members relative to each other. That is, first and second support members 118, 120 are configured to be movable laterally toward and/or away from one another (e.g., configured to be laterally proximate to each other or separate from each other), generally dependent upon the level of vertical extension of the first and second support members and the amount of rotation of the roller 126 at full extension. In one embodiment, panel 104 may include vane elements 112 extending between, and preferably coupled to, first support member 118 and second support member 120.

Covering 100 may include a control mechanism 106 for controlling the retraction and extension of panel 104 to regulate the height of the panel 104 over or within the architectural feature, which may control the nature and quality of the transmitted light, the view-through characteristics, the shape, and/or the aesthetic nature of panel 104. The control mechanism 106 may be configured to rotate roller 126 in order to retract, extend, and/or laterally separate the support members 118, 120. If the panel has vane elements, the control mechanism 106 in certain embodiments may also control the angular orientation of vane elements 112 with respect to support members 118, 120, which may also affect the nature and quality of the light transmitted therethrough, the view-through characteristics, the shape, and/or the aesthetic appeal of the panel 104. In one example, the control mechanism 106 may include a system or mechanism for controlling the rotation of roller 126 such as an electric motor, which may be controlled manually by a user or through a pre-programmed or programmable software control unit, such as a remote control. Alternatively and/or additionally, control mechanism 106 may include a cord 108 for rotating the roller 126, and may include a pulley 109, a direct drive arrangement, a gear train, and/or a clutch mechanism.

Figure 1B:
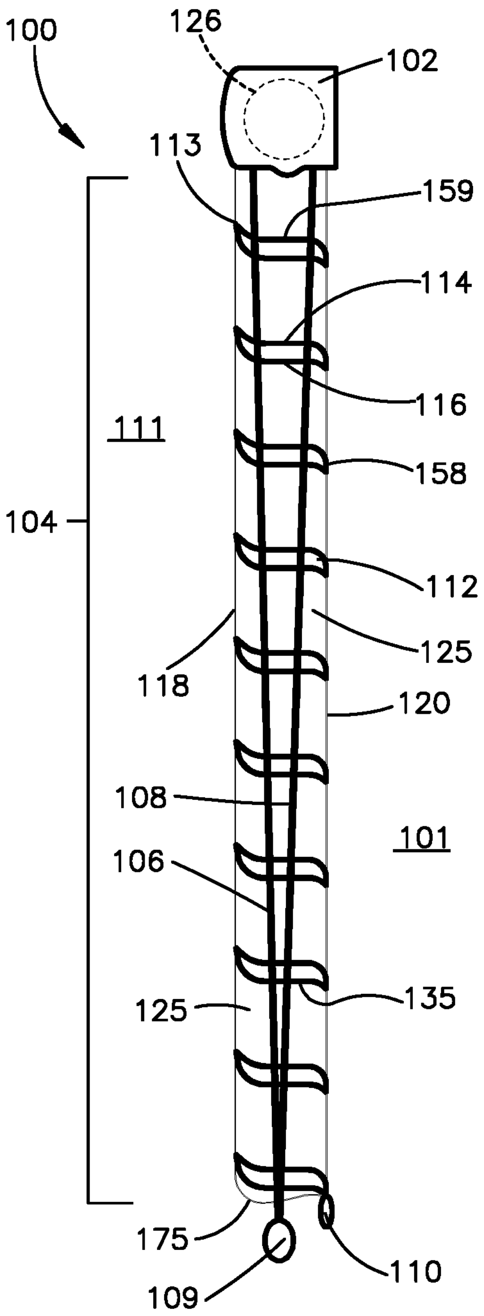
FIG. 1B is a side view of the covering system of FIG. 1A.
Figure 1C:
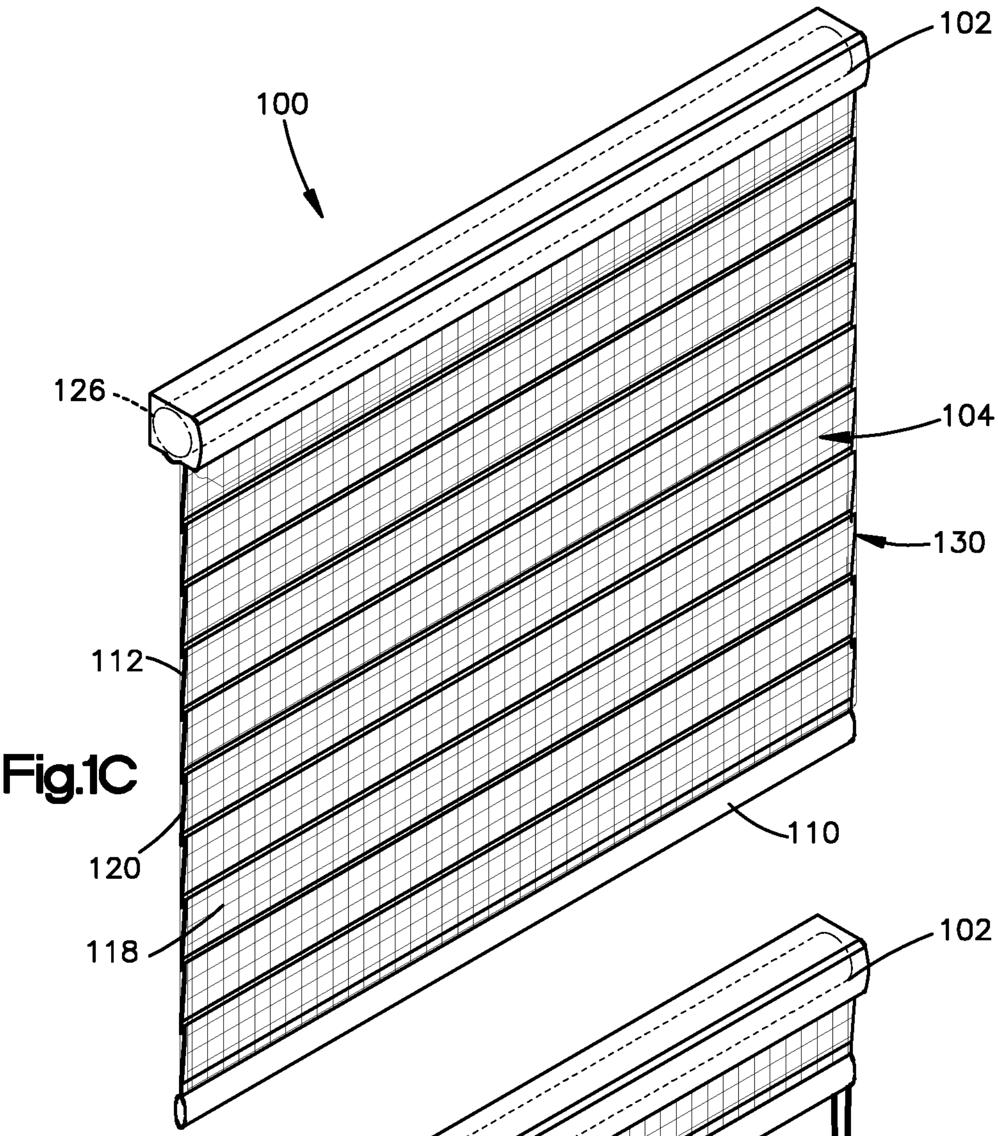
FIG. 1C is a perspective view of the covering system of FIG. 1A in a fully-extended position with a plurality of vanes in a closed or collapsed configuration.
Figure 1D:
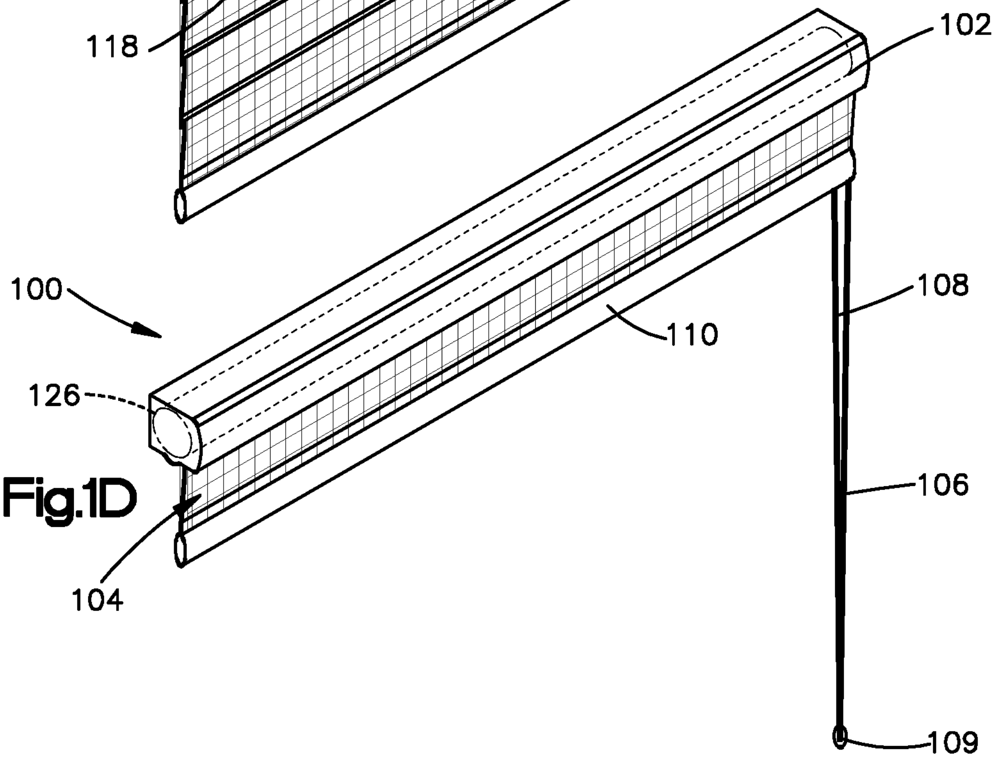
FIG. 1D is a perspective view of the covering system of FIG. 1A in a retracted position.

As shown in FIG. 1D, first and second support members 118, 120 may move vertically in unison as they are unrolled from roller 126 to extend and hang from the roller 126 under the influence of gravity. The panel 104 has a fully-extended, closed position as shown in FIG. 1C when the support members are completely unrolled from the roller 126 and are generally parallel and adjacent to each other. If the panel includes vane elements, the vane elements are generally in a closed position where they extend in a generally vertical position when the panel is in a fully-extended, closed position. Further rotation of roller 126 from the fully-extended closed position shown in FIG. 1C moves first support member 118 and/or second support member 120 laterally or horizontally away from each other as shown in FIGS. 1A-1B to a fully-extended, open position where the support members are generally vertical and parallel, but no longer adjacent each other. This further movement may move first and second support members 118, 120 in distinct vertical directions. If the panel includes vane elements, the vane elements are generally in an open position where they extend in a generally horizontal position when the panel is in a fully-extended, open position as shown in FIGS. 1A-1B.

Roller and headrail designs that inhibit and/or prevent unwanted motion of support members may be desirable in coverings. For example, inhibiting and/or preventing undesirable movement of the support members may inhibit and/or prevent formation of a gap between the bottom rail member and the bottom portion of the architectural feature. Thus, in accordance with various aspects of the disclosure described further herein, a covering system capable of maintaining the bottom rail member level relative to the bottom portion of the architectural feature at a fully-extended position is disclosed. Additionally, roller and support member configurations capable of allowing for greater lateral extension of the vane elements to a substantially perpendicular orientation with respect to the support members when the support members are in fully-extended position are also disclosed herein.

Figure 2:
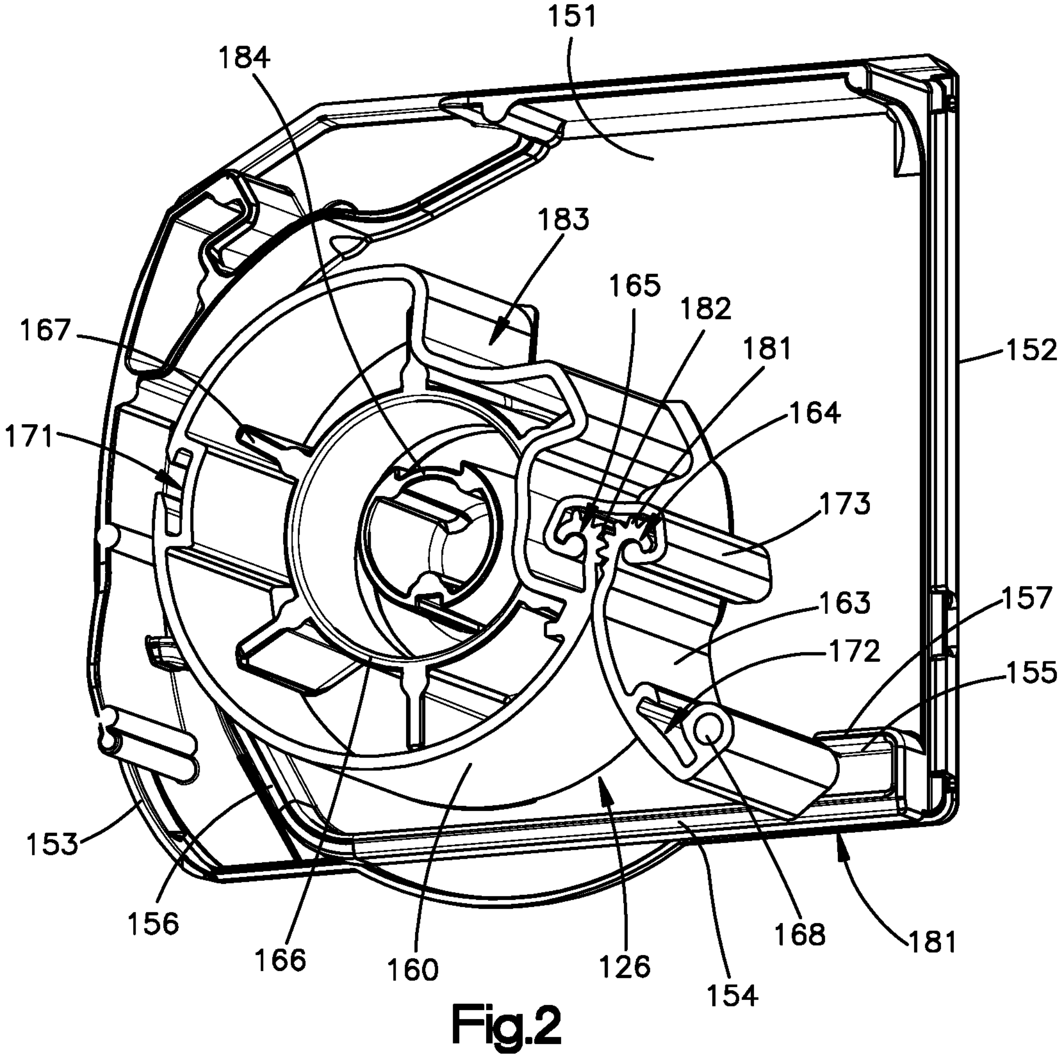
FIG. 2 is a perspective view of select components of a first embodiment of a sectioned roller mechanism, which may be used in conjunction with a covering system.

With reference to FIG. 2, details of select components of a sectioned roller mechanism for use in connection with a roller-type covering system 200 (shown in FIGS. 3A-3C) in accordance with an aspect of the disclosure are shown. Covering system 200 includes an end cap 151 associated with one end of a headrail 102. End cap 151 has a front surface 153, a rear surface 152, and a track 154 extending laterally and horizontally across a bottom portion 181 of end cap 151. The track 154 includes a front section 156 and stop section 155. As will be described further herein, track 154 is configured to form a guide upon which pin 168 associated with a flapper portion 163 is capable of traveling as the covering reaches a fully-extended position. In one embodiment, stop section 155 may be formed as a substantially L-shaped extension from the horizontal surface of track 154 such that at least a top surface 157 is spaced from, and parallel to, the horizontal surface of track 154. The top surface 157 of stop section 155 may be sized and shaped to form a stop for pin 168 associated with flapper portion 163. In another embodiment, an internal limit nut and limit screw system (similar to that shown and described with respect to FIG. 4 below) may be utilized to form a stop. Additionally and/or alternatively, front section 156 may form a curved lip section to allow for pin 168 to gradually travel to and/or from the horizontal surface of track 153 as the covering is in a fully-extended position. While the stop section 155 and the front section 156 have been shown and illustrated as having a certain shape, configuration, size, and relationship to the roller 126, it will be appreciated that other shapes, sizes, and configurations may be utilized for track 154. While covering system 200 generally incorporates two endcaps in one embodiment, at least one end cap 151 incorporates track 154. In accordance with one aspect of the disclosure, end cap 151 is preferably the end cap located opposite the control mechanism 106 of the covering. However, in another aspect of the disclosure, both end caps may incorporate track 154.

Extending inwardly from end cap 151 is a stationary hub 184, over which a bushing 166 rotates relative to end cap 151. Bushing 166 may have one or more radially extending ribs or projections 167 extending therefrom which engage roller 126. Surrounding bushing 166 is the roller 126, which is formed of both a main body portion 160 and a flapper portion 163. As will be described in further detail herein, flapper portion 163 is a sectioned portion of roller 126 that is configured to pivot away (i.e., flap) from main body portion 160 during operation of the covering when at or near a fully-extended position. For ease of illustration, roller 126, and all features of roller 126, are shown in truncated form. It is to be understood that roller 126, and the associated features of roller 126, are configured to extend substantially the entire width of the covering system so as to support the covering across its entire width.

Roller 126, for ease of reference, is illustrated in FIG. 2 without the respective proximal ends of both first and second support members 118, 120 coupled thereto. Main body portion 160 includes a gland 171, sized and shaped to retain the proximal end of first support member 118, while flapper portion 163 includes a gland 172, similarly sized and shaped to retain the proximal end of second support member 120. Main body portion 160 may also have an indent portion 183, which may provide space for the structural features and shape of at least a portion of flapper portion 163 when the covering is at least partially in a retracted (i.e., non-fully-extended) configuration. In this regard, the outer surface of main body portion 160 and the outer surface of the flapper portion 163 provide a surface about which the covering material may be wrapped or rolled upon, and preferably forms a substantially circumferential cylinder surface.

Flapper portion 163 is pivotally coupled to main body portion 160 about respective pivot joint ends 164, 165. As shown in FIG. 2, pivot joint ends 164, 165 may be coupled as a gear joint, with respective gear teeth 181, 182 intermeshing to allow for pivoting of flapper portion 163 relative to main body portion 160. A C-shaped bracket 173 may extend about the respective pivot joint ends 164, 165 to associate, and preferably couple, flapper portion 163 to main body portion 160, while permitting flapper portion 163 to pivot extensively away from main body portion 160. Flapper portion 163 may be configured to be capable of pivoting between 0° and 180° way from main body portion 160, and, in accordance with one aspect of the disclosure, may pivot 150° away from main body portion 160 before flapper portion 163 is restricted from further pivotal movement. Configuring pivot joint ends 164, 165 as a gear joint in such a manner may permit this extended pivoting range, whereas other types of joints may limit the pivot range of flapper portion 163. However, in accordance with other aspects of the disclosure, pivot joint ends 164, 165 may be configured as any other type of joint, such as a ball-and-socket joint. Moreover, a single pivot joint may be formed between flapper portion 163 and main body portion 160.

Figure 3A:
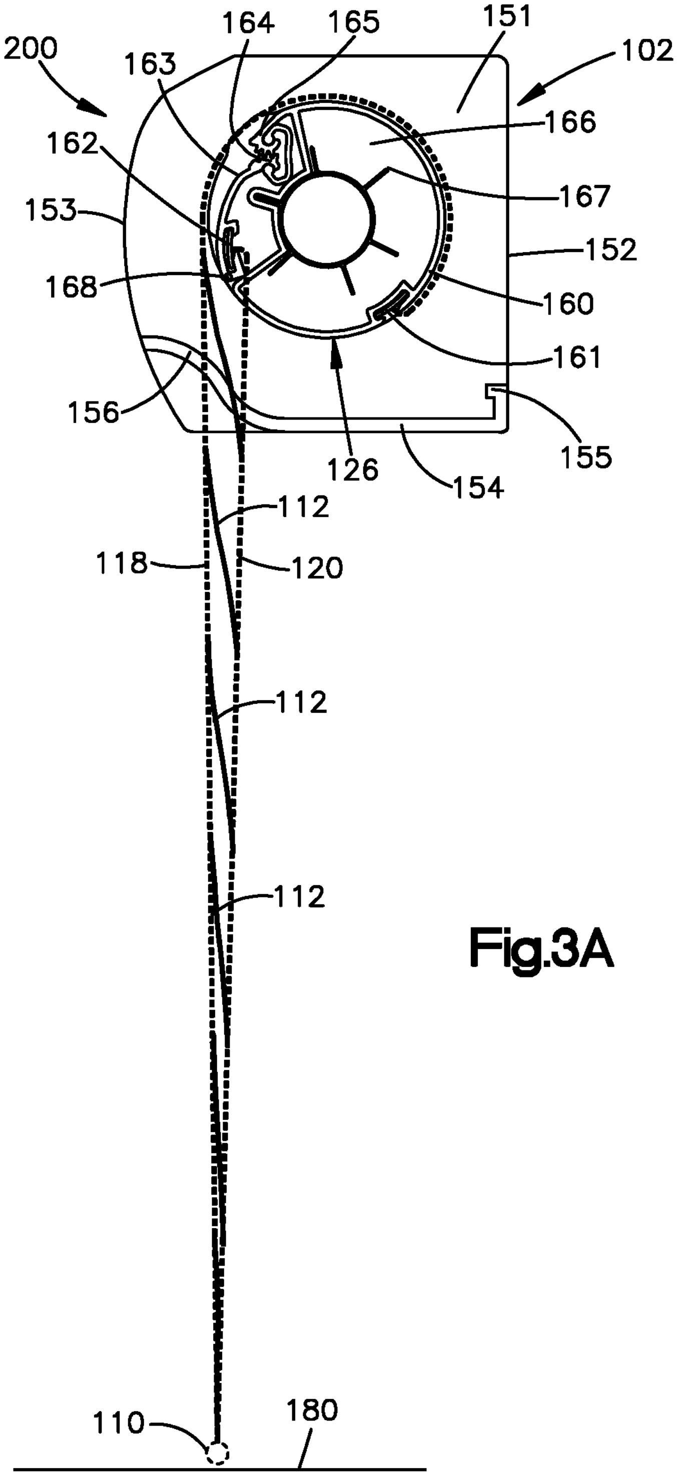
FIG. 3A is a side view of an embodiment of a covering system in a first rotational orientation.
Figure 3B:
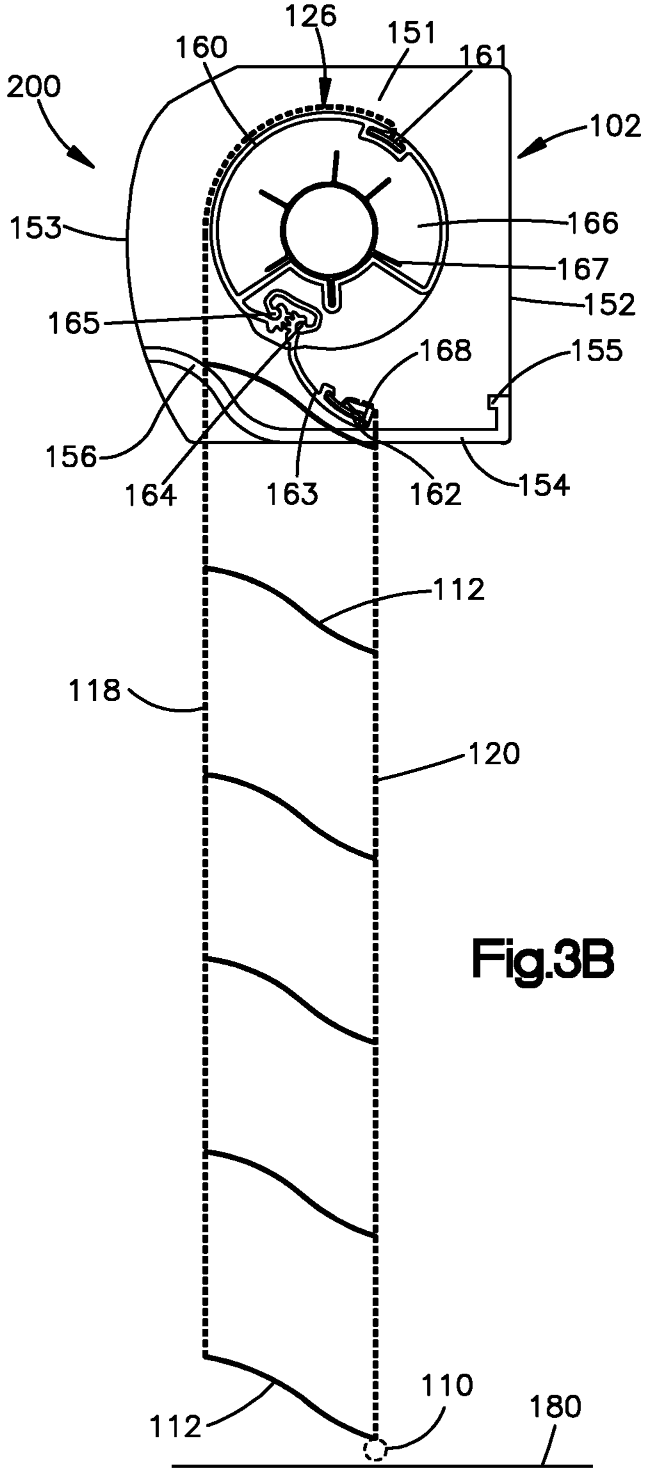
FIG. 3B is a side view of the covering system of FIG. 3A in a second rotational orientation.
Figure 3C:
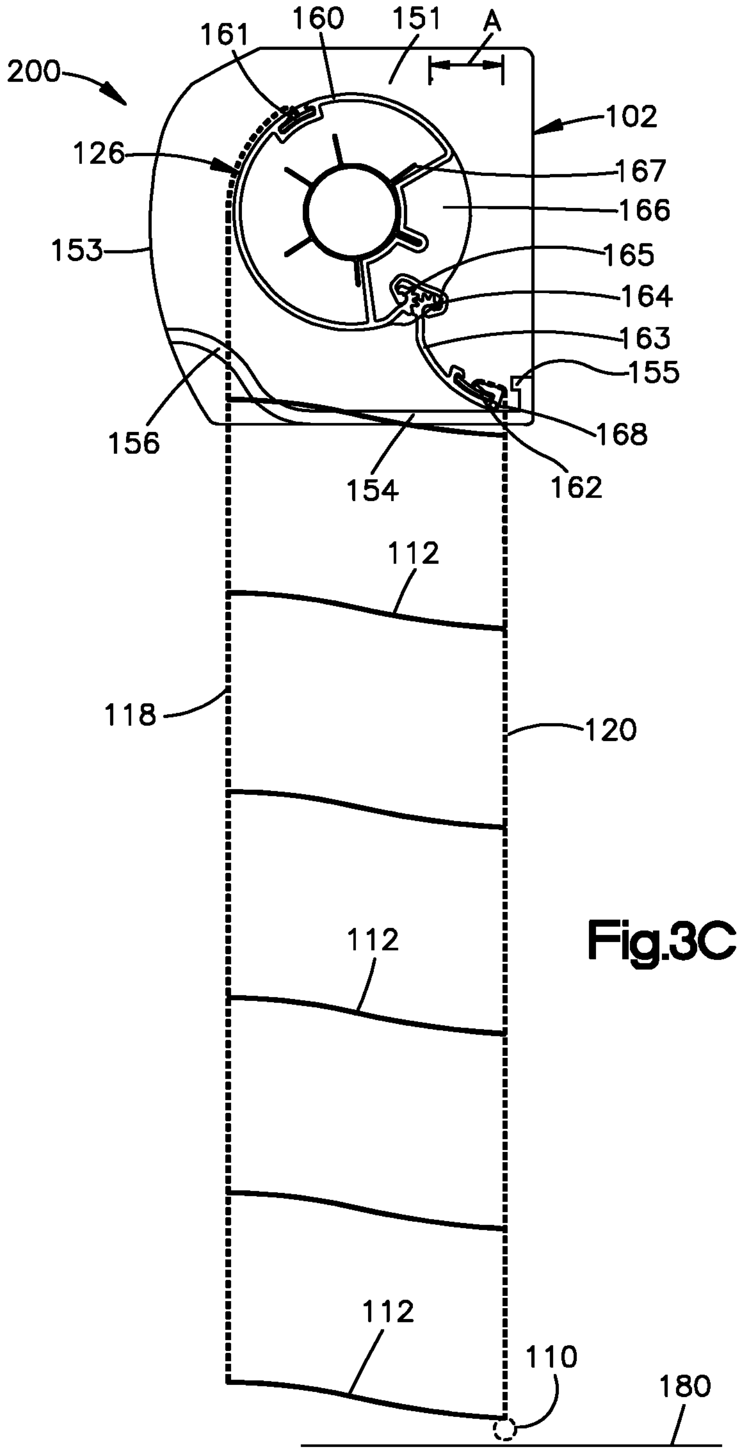
FIG. 3C is a side view of the covering system of FIG. 3A in a third rotational orientation.

Referring to FIGS. 3A-3C, side views of portions of a covering system 200 using the sectioned roller mechanism of FIG. 2 are shown. Those skilled in the art will recognize that the drawings are not to scale, and further that the side views shown in FIGS. 3A-3C are for explanatory and illustrative purposes only, and, thus, do not show each and every element and/or feature present in covering system 200. As with covering 100 described above, covering system 200 includes a headrail 102, a first support member 118, a second support member 120, and a plurality of vanes 112 coupled between respective support members 118, 120. The roller 126 substantially surrounds and may be coupled to a bushing 166 having a plurality of radially-extending ribs 167 extending therefrom, with bushing 166 being rotatably coupled to an end cap 151 of headrail 102 to allow for rotational movement of roller 126 with respect to headrail 102.

As shown in FIG. 2 and FIG. 3A, roller 126 is formed as a multi-piece component comprising main body portion 160 partially surrounding bushing 166, a flapper portion 163 associated with, and preferably pivotally coupled to main body portion 160. A top end 161 of first support member 118 is associated with, and preferably coupled to, main body portion 160, while a top end 162 of second support member 120 is associated with, and preferably coupled to, flapper portion 163. The respective top ends 161, 162 may be coupled to main body portion 160 and flapper portion 163 via any suitable attachment means. The location where the first support member 118 is coupled to main body portion 160 is circumferentially spaced from the location where the second support member 120 is coupled to flapper portion 163, and the respective support members 118, 120 may be coupled either directly or indirectly. For example, a gland or rib 171, 172 may be formed in each of respective main body portion 160 and flapper portion 163, with the glands or ribs 171, 172 sized and shaped to accept the respective top ends 161, 162 of support members 118, 120 therein. In some aspects of the disclosure, a strip of material (e.g., a strip of plastic) may be sized and shaped to securely fit within the glands or ribs 171, 172 to retain respective top ends 161, 162 therein. The top end 162 of the second support member 120 may be associated with the flapper portion 163 at any location. However, it may be preferred to associate the top end 162 of the second support member 120 at or near an end of the flapper portion 163 opposite the pivot joint end 164, which extends away from the roller 126.

The bottom ends of both the first and second support members 118, 120 may be associated with, and preferably coupled to, the bottom rail 110. In some aspects of the disclosure, bottom rail 110 is held at the bottom end of second support member 120, with first support member 118 laterally separated from bottom rail 110 when the plurality of vanes 112 are in an "open" configuration. In other aspects, the bottom rail 110 may be directly coupled to one of the first or second support members 118, 120. However, in other, alternative aspects of the disclosure, the bottom rail may be coupled to (and span between) the distal ends of both the first and second support members 118, 120 such that a front portion of the bottom rail is vertically in-line with the first support member 118, while a rear portion of the bottom rail is vertically in-line with the second support member 120.

Referring still to FIG. 3A, covering system 200 is shown in a configuration in which the covering has reached its fully-extended position relative to a surface 180 (e.g., a window sill), but the plurality of vanes 112 are held in a "closed" position. In this configuration, main body portion 160 and flapper portion 163 cooperate to form a substantially cylindrical roller, as at least a portion of first support member 118 still lies over flapper portion 163, thereby preventing flapper portion 163 from pivoting relative to main body portion 160. While not shown, main body portion 160 and flapper portion 163 similarly cooperate to form a substantially cylindrical roller when the first and second support members 118, 120 (and coupled vanes 112) are retracted within the headrail 102.

However, referring to FIG. 3B, when roller 126 is further rotated in a counter-clockwise direction (relative to the view shown in FIG. 3B) at the fully-extended position of the covering, first support member 118 (and/or second support member 120) no longer lies over flapper portion 163, thereby allowing flapper portion 163 to pivot about pivot joint end 164, downward and away from main body portion 160. Flapper portion 163 includes a pin 168 (or other projection) protruding from an end region substantially opposite pivot joint end 164, and as flapper portion 163, under the influence of gravity, pivots away from main body portion 160, pin 168 contacts track 154, and more specifically curved section 156. Track 154 extends along a bottom section 181 of end cap 151 generally from a front surface 153 and a rear surface 154 of end cap 151. In some embodiments, track 154 protrudes inwardly relative to roller 126 so as to provide a guide surface upon which pin 168 may travel. In other embodiments, track 154 may be configured in other, non-protruding forms, such as being formed as a groove or the like within end cap 151. As detailed above with respect to FIG. 2, track 154 may have a front section 156 to gradually guide pin 168 downward toward the horizontal portion of track 154 as it falls to track 154. Front section 156 will also guide pin 168 upward (and pivot flapper portion 163 upward and inward) when roller 126 is rotated in the opposite (e.g., clockwise) direction. As roller 126 continues to be rotated in a counter-clockwise direction, pin 168 is able to freely slide linearly and horizontally along track 154 in the direction of rear surface 152 of end cap 151. As the second support member 120 is coupled to flapper portion 163 near or substantially adjacent to pin 168, continued rotation of roller 126 enables second support member 120 to separate laterally from first support member 120 in the direction of rear surface 152, thereby at least partially opening the plurality of vanes 112.

As track 154 extends substantially linearly and horizontally along the bottom portion 181 of end cap 151, top end 162 of second support member 120 travels horizontally along track 154, which enables second support member 120 (and, thus, bottom rail 110) to maintain a substantially constant height above surface 180 as roller 126 is rotated in a counter-clockwise direction to "open" the covering. Accordingly, while bottom rail 110 travels laterally in the direction of rear surface 152 of end cap 151 during counter-clockwise rotation of roller 126, there is little to no vertical movement of bottom rail 110 relative to surface 180 during rotation, as pivotable flapper portion 163 allows for horizontal displacement of second support member 120 relative to first support member 118, yet limits and/or prevents corresponding vertical displacement of the second support member 120 due to further rotational movement of roller 126. Thus, unwanted gaps may be avoided and/or prevented from forming between bottom rail 110 and surface 180, and the bottom rail 110 may be steadied as the covering reaches a fully-extended position and the vanes are moved to an "open" position. That is, as pin 168 slides along horizontal surface 182 of track 154, the second support member 120 does not extend any lower and is a substantially fixed length, allowing bottom rail 110 to remain steady and at a substantially constant vertical position relative to surface 180 as the vanes move from a closed to an open position.

Referring now to FIG. 3C, covering system 200 is shown in a "fully-open" configuration, wherein support members 118, 120 are laterally spaced apart at or close to their maximum distance. As described above with respect to FIG. 3B, pin 168 at the end of flapper portion 163 is capable of sliding horizontally along track 154 toward rear surface 152 of end cap 151 as roller 126 is rotated in a counter-clockwise direction. At or near rear surface 152, track 154 includes stop section 155 which acts to catch pin 168 as roller 126 continues to rotate to prevent any additional counter-clockwise rotation of roller 126. When pin 168 is restricted by stop section 155, and in particular the top surface 157 blocks vertical movement of pin 168 (which blocks vertical movement of flapper portion 163), flapper portion 163 is pivoted to its furthest open position relative to main body portion 160. However, because pin 168 and stop section 155 interact to prevent further counter-clockwise rotation of roller 126, second support member 120 and coupled bottom rail 110 maintain a substantially constant height above surface 180 in the "fully-open" configuration of covering system 200, again preventing unwanted gaps from forming between bottom rail 110 and surface 180. Furthermore, because flapper portion 163 is configured to pivot away from main body portion 160, second support member 120 and bottom rail 110 do not substantially move vertically relative to surface 180 in the "fully-open" configuration.

In addition to maintaining the vertical spacing between bottom rail 110 and surface 180 in the "fully-open" configuration, flapper portion 163 of roller 126 also enables additional lateral displacement between first support member 118 and second support member 120, thereby allowing for further separation of the support members 118, 120. With a conventional covering system and roller configuration, the lateral displacement between first and second support members would generally be limited to about the diameter of the roller itself, as the top ends of the respective support members are typically coupled along a surface of the cylindrical roller. However, in covering system 200, flapper portion 163, when pivoted into an open position and restricted by stop section 155, laterally extends the distance between the main body portion 160 of roller 126 and the top end 162 of second support member 120 by a distance A, as shown in FIG. 3C. Additionally, because the top end 162 of second support member 120 is held at a vertical position below roller 126 due to flapper portion 163, the roller 126 may be rotated to a position in which top end 161 of first support member 118 is substantially at its forward-most circumferential location along roller 126, allowing for additional lateral spacing between first support member 118 and second support member 120. Such additional lateral displacement between first support member 118 and second support member 120 may act to pull vanes 112 into an increasingly horizontal position, which may affect the shape and aesthetic appearance of the vanes 112 and permit increased light entry and visibility therethrough, but may do so without altering the vertical spacing between bottom rail 110 and surface 180. By varying lateral spacing A and the size of the flapper portion, the shape of the track, the materials of the vanes, and other factors, the shape and aesthetics of the covering may be altered.

Figure 4:
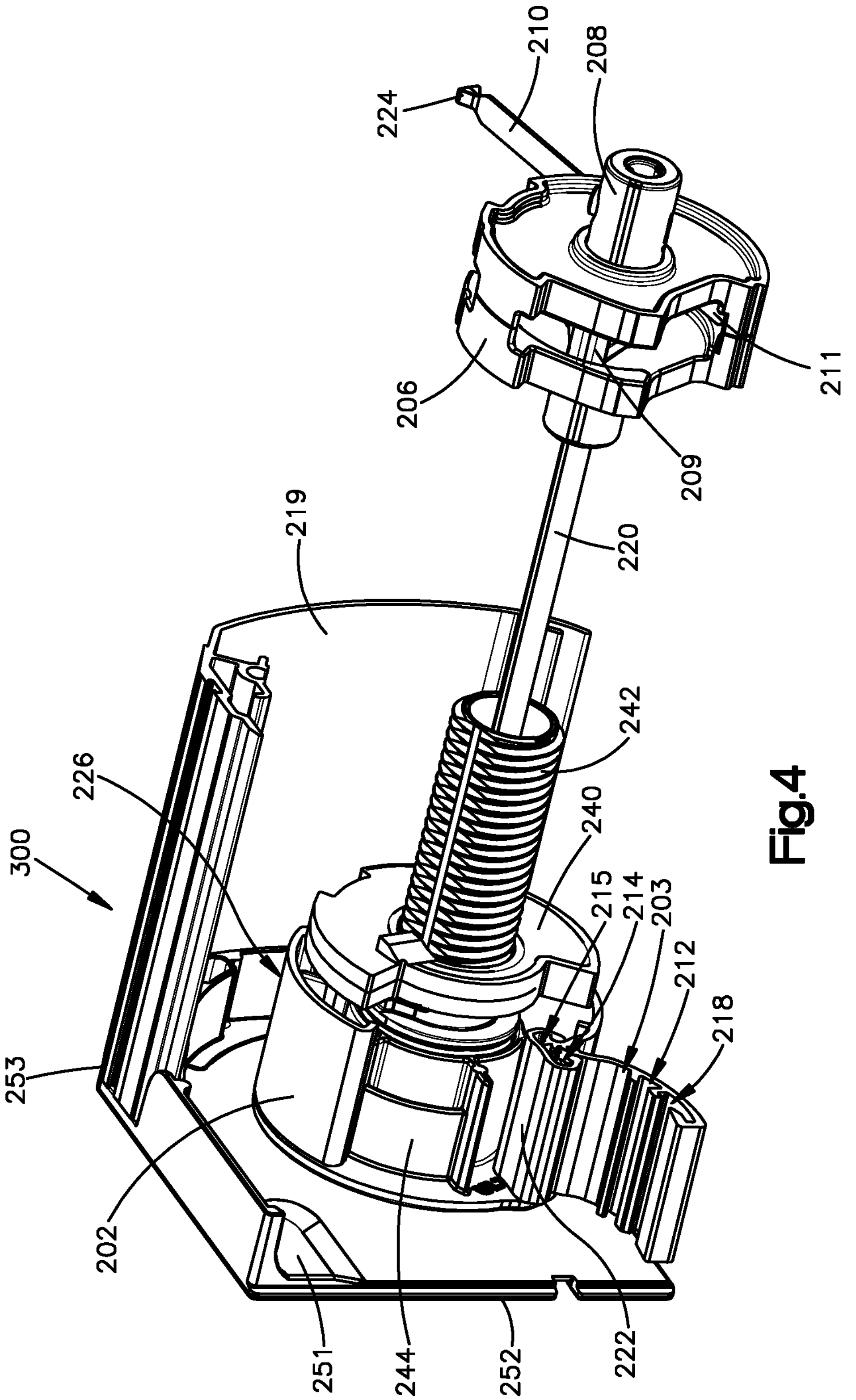
FIG. 4 is a perspective view of select components of another embodiment of a sectioned roller mechanism, which may be used with a covering system.

FIG. 4 illustrates details of select components of another embodiment of a sectioned roller mechanism 301 for use in connection with a covering system 300 are shown. As with FIG. 2 described above, some elements of covering system 300 have been omitted or truncated for the purposes of illustration. Covering system 300 includes an end cap 151 associated with one end of a headrail 102. End cap 151 has a front surface 153 and a rear surface 152. While not shown, it is to be understood that a second end cap is present at an end of headrail 102 opposite end cap 151. A front wall 219 may extend across the entire width of covering system 300, between the respective end caps, so as to shield, hide, and/or enclose the covering and other mechanisms associated with covering system 300. While not shown, a top and/or rear wall may also extend across the entire width of covering system 300.

A bushing 244 is configured to rotate relative to end cap 151. Surrounding bushing 244 is the roller 126, which is formed of both a main body portion 202 and a flapper portion 203. Roller 126 is coupled to bushing 244, and bushing 244 and roller 126 may rotate relative to the headrail 102. For ease of illustration, roller 126, and some of the features of roller 126, are shown in truncated form. It is to be understood that roller 126, and some of the features of roller 126, are configured to extend substantially the entire width of the covering system so as to support the covering across its entire.

Roller 126 is illustrated in FIG. 4 without the respective top ends of both first and second support members coupled thereto. Flapper portion 203 may include a gland 218, sized and shaped to retain the top end of a second support member. Gland 218 is shown at an end of the flapper portion 203, but may be positioned at other locations. Main body portion 202 may also include a similar gland (not shown), sized and shaped to retain the top end of a first support member. Flapper portion 203 also includes a connection point 212 configured to retain the second end 224 of flexible strap 210, which is shown as disconnected from connection point 212 only for the purposes of illustration. Connection point 212 is shown adjacent to gland 218, but may be positioned and configured in a different location along flapper portion 203. In assembled form, one end 224 of the flexible strap 210 extends from the connection point 212 on the flapper portion 203 and wraps around cam surface 209 on the cam mechanism 208, and thereafter extends and is connected at the other end 211 to the cam housing 206. The flexible strap 210, as described below, will act to limit motion of the flapper portion 203.

Stationary cam mechanism 208 is associated with, and preferably coupled to, a rod member 220 that is coupled to and extends from end cap 151. The rod member 220 is preferably non-rotatably connected to the end cap 151, and the cam mechanism 208 is preferably non-rotatably connected to the rod member 220, for example, by set screws. Cam housing 206 surrounds and rotates about cam mechanism 208 in conjunction with roller 126. The first end 211 of flexible strap 210 is associated with, and preferably coupled to, the cam housing 206. Roller 126 surrounds and is coupled to cam housing 206. A threaded limit nut 240 is also surrounded by roller 126, and an external surface of limit nut 240 engages with an interior surface of roller 126. Limit nut 240 is configured to have a partial thread formed on an interior surface which engages complementary thread features on a fixed limit screw 242 that passes within roller 126. While not shown in FIG. 4, both limit nut 240 and limit screw 242 include stop features thereon to limit the amount of rotation of roller 126. As the covering is rolled up upon roller 126, the limit nut 240 traverses away from the stop on the limit screw 242. However, as the covering is extended from roller 126, the limit nut 240 moves toward and eventually contacts the stop on the limit screw 242, thereby limiting the amount of rotation of roller 126.

Disposed within the interior of roller 126 is the stationary cam mechanism 208 having a centrally-offset cam surface 209. Cam mechanism 208 does not rotate with rotation of roller 126, and thus cam surface 209 remains stationary, regardless of the rotary position of roller 126. However, cam housing 206 is configured to substantially surround stationary cam mechanism 208, and cam housing 206 is coupled to an interior portion of roller 126 to rotate in concert with roller 126.

The cam housing 206 and limit nut 240 are inserted within roller 126, and more specifically, are sized and shaped to accommodate the flapper portion 203 (and permit flapper portion 203 to pivot) and the main body portion 202, which preferably associates roller 126 with cam housing 206 and limit nut 240 in order to rotate cam housing 206 and limit 240. Cam housing 206 may be positioned at any location along rod 220, and more than one cam housing 206 and/or cam mechanism 208 may be utilized.

Figure 5:
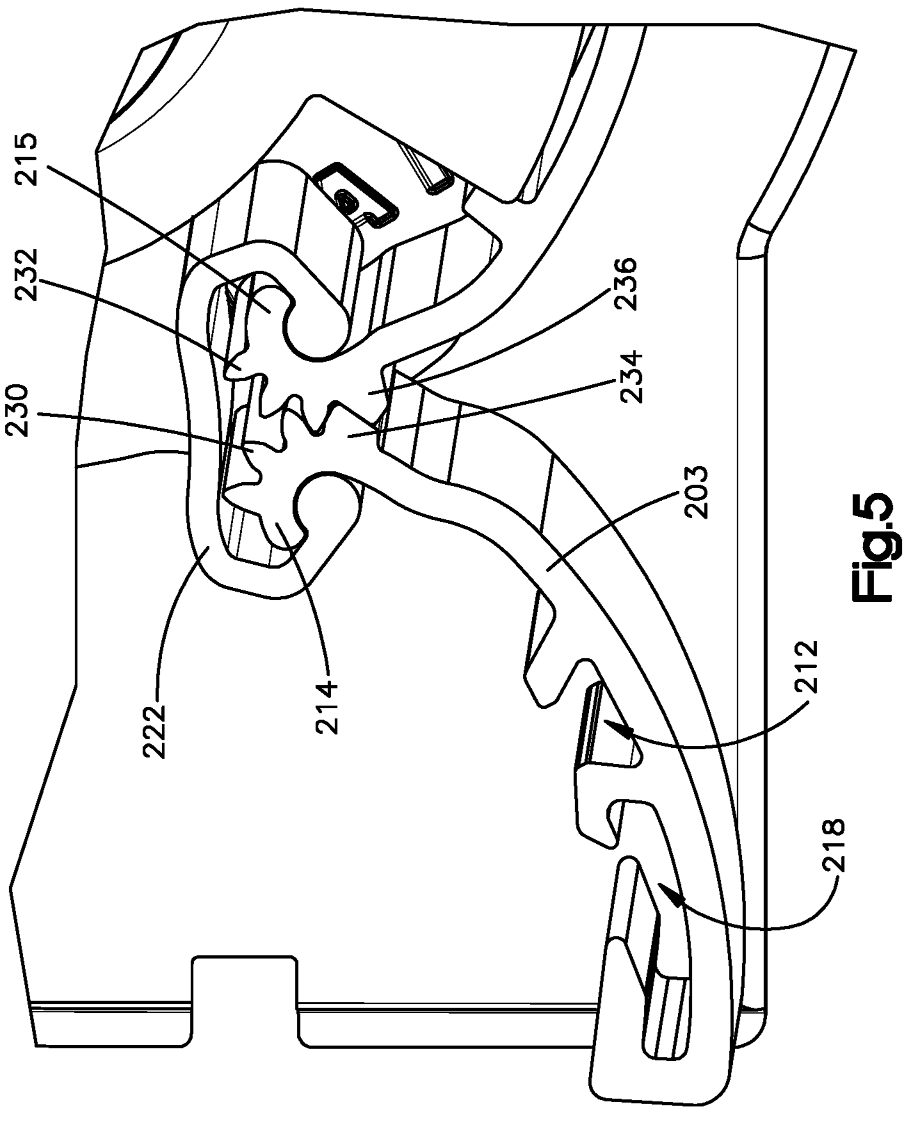
FIG. 5 is another perspective exploded view of a portion of the sectioned roller mechanism of FIG. 4.

As discussed above with respect to FIG. 4, flapper portion 203 is pivotably coupled to main body portion 202 via respective pivot joint ends 214, 215. As shown in FIGS. 4-5, pivot joint ends 214, 215 may be formed as a gear joint, with respective gear teeth 230, 232 intermeshing to allow for pivoting of flapper portion 203 relative to main body portion 202. A C-shaped bracket 222 may extend about the respective pivot joint ends 214, 215 to couple flapper portion 203 to main body portion 202, while still enabling flapper portion 203 to pivot extensively away from main body portion 202. Flapper portion 203 may be configured to be capable of pivoting between 0° and 180° way from main body portion 202, and, in accordance with one aspect of the disclosure, may pivot 130° away from main body portion 202 before flapper portion 203 is restricted from further pivotal movement. Configuring pivot joint ends 214, 215 as a gear joint in such a manner may permit this extended pivoting range, whereas other types of joints may limit the pivot range of flapper portion 203. FIG. 5 shows respective limit stops 234, 236 on each of pivot joint ends 214, 215, which effectively limit the angular orientation of flapper portion 203 with respect to main body portion 202 to approximately 130°, as disclosed above. Configuring pivot joint ends 214, 215 as a gear joint in such a manner may permit this extended, but limitable, pivoting range. However, in accordance with other aspects of the disclosure, pivot joint ends 214, 215 may be configured as any other type of joint, such as a ball-and-socket joint. Moreover, a single pivot point may be formed between flapper portion 203 and main body portion 202

Figure 6A:
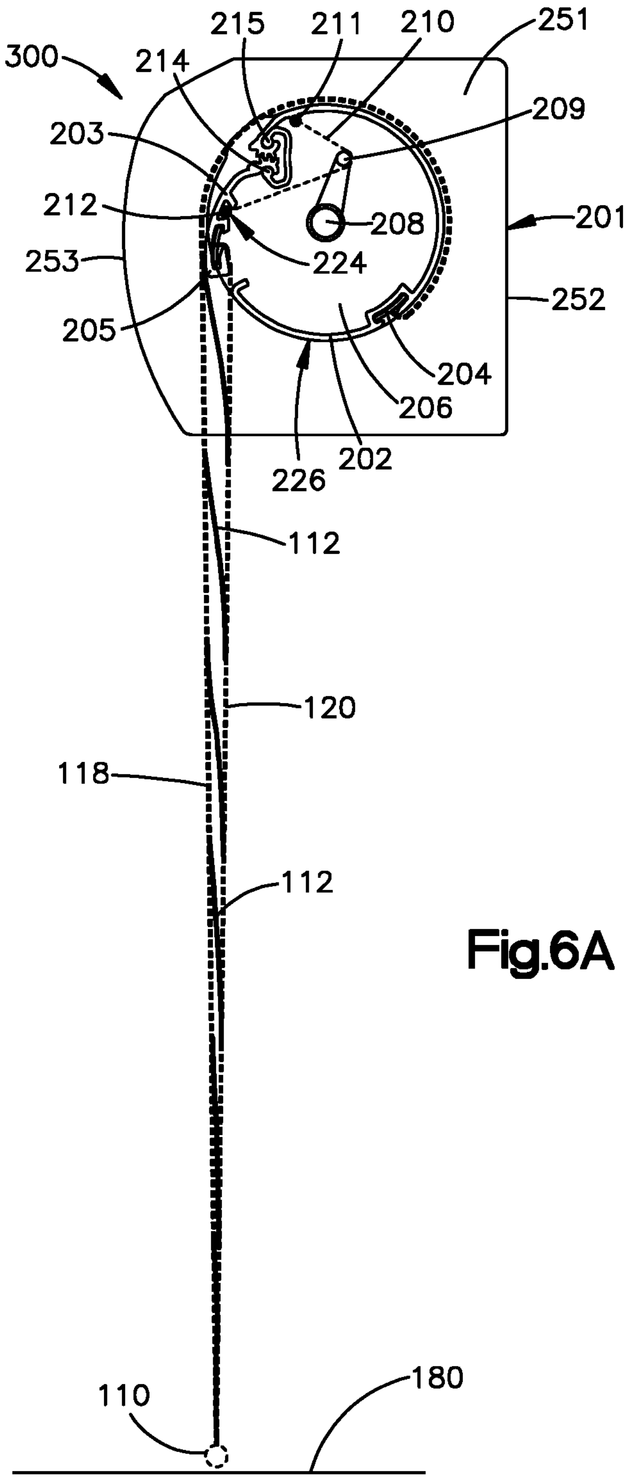
FIG. 6A is a side view of another embodiment of a covering system in a first rotational orientation.
Figure 6B:
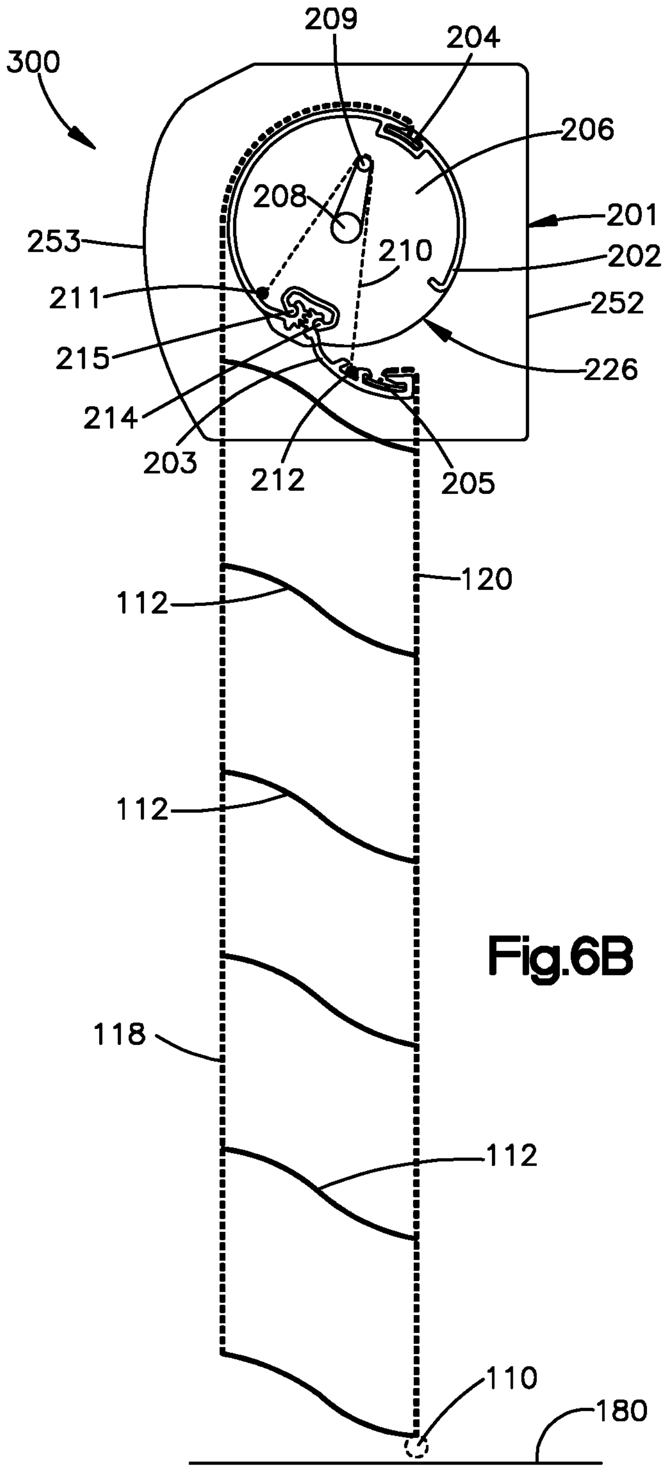
FIG. 6B is a side view of the covering system of FIG. 6A in a second rotational orientation.
Figure 6C:
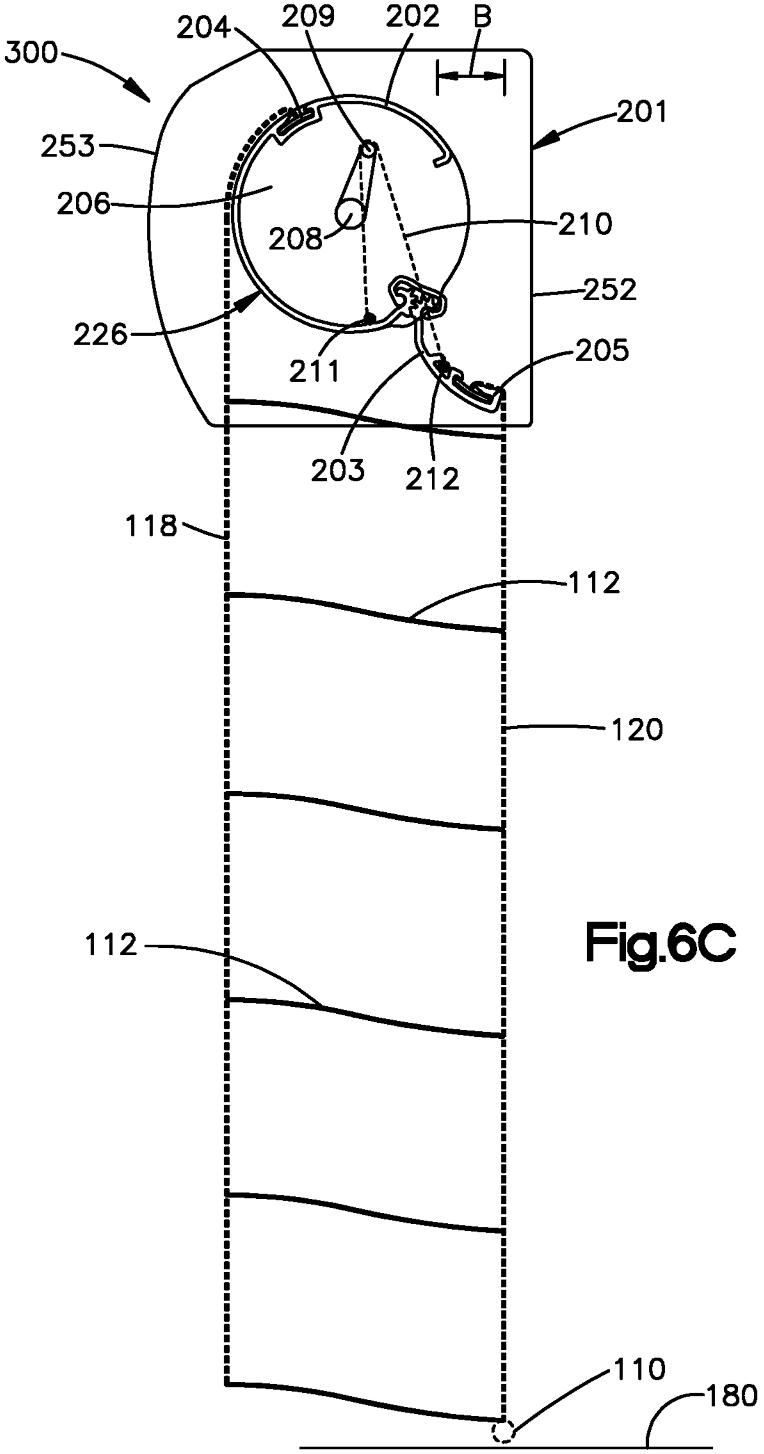
FIG. 6C is a side view of the covering system of FIG. 6A in a third rotational orientation.

Next, referring to FIGS. 6A-6C, a covering system 300 using the sectioned roller mechanism of FIG. 4 is shown. Those skilled in the art will recognize that the side views shown in FIGS. 6A-6C are not to scale and are for explanatory and illustrative purposes only, and, thus, do not show each and every element and/or feature present in covering system 300. As with covering 100 and covering system 200 described above, covering system 300 includes a headrail 102, a first support member 118, a second support member 120, and a plurality of vanes 112 coupled between respective support members 118, 120. The roller 126 is rotatable relative an end cap 151 of headrail 102 to allow for extension and retraction of the respective support members 118, 120.

Referring to FIG. 6A, roller 126 is formed as a multi-piece component comprising main body portion 202, with a flapper portion 203 associated with, preferably pivotally coupled to, main body portion 202 via respective pivot joint ends 214, 215. A top end 204 of first support member 118 is associated with, preferably coupled to, main body portion 202, while a top end 205 of second support member 120 is associated with, preferably coupled to, flapper portion 203. The respective top ends 204, 205 may be coupled to main body portion 202 and flapper portion 203 via any suitable attachment means. The location where first support member 118 is coupled, either directly or indirectly, to the roller 126 is circumferentially spaced from where the second support member 120 is coupled, either directly or indirectly, to roller 126. For example, a gland or rib 218 may be formed in each respective main body portion 202 and flapper portion 203, with the glands or ribs 218 sized and shaped to accept the respective top ends 204, 205 of support members 118, 120 therein. In some aspects of the disclosure, a strip of material (e.g., a strip of plastic) may be sized and shaped to securely fit within the glands or ribs 218 to retain respective top ends 204, 205 therein. The top end 205 of second support member 120 may be associated with the flapper portion 203 at any location. However, it may be preferred to associate the second support member 120 at or near an end of flapper portion 203 opposite the pivot joint end 214 and which extends away from the roller 126.

The bottom ends of both the first and second support members 118, 120 may be associated with, preferably coupled to, the bottom rail 110. In some aspects of the disclosure, bottom rail 110 is coupled to second support member 120, with first support member 118 laterally separated from bottom rail 110 when the plurality of vanes 112 are in an "open" configuration. In one embodiment, the bottom rail 110 may be directly coupled to only one of the front and second support members 118, 120, while the other of the first or second support members may be indirectly coupled or directly coupled to the bottom rail 110. However, in other, alternative aspects of the disclosure, the bottom rail 110 may be coupled to (and span between) the bottom ends of both the first and second support members 118, 120 such that a front portion of the bottom rail is vertically in-line with the first support member 118, while a rear portion of the bottom rail is vertically in-line with the second support member 120.

Referring still to FIG. 6A, covering system 300 is shown in a configuration in which the covering has reached its fully-extended position relative to a surface 180 (e.g., a window sill), but the plurality of vanes 112 are maintained in a "closed" position. In this configuration, main body portion 202 and flapper portion 203 cooperate to form a substantially cylindrical roller, as at least a portion of first support member 118 still lies over flapper portion 203, thereby preventing flapper portion 203 from pivoting relative to main body portion 202. While not shown, main body portion 202 and flapper portion 203 similarly cooperate to form a substantially cylindrical roller when the first and second support members 118, 120 (and coupled vanes 112) are retracted within the headrail 102.

Flexible strap 210 is at least partially within cam housing 206 and wraps partially around (and slides over) cam surface 209. A first end 211 of flexible strap 210 is pivotally coupled to cam housing 206 such that first end 211 moves upon rotational movement of cam housing 206. A second end 224 of flexible strap 210, on the other hand, is coupled to a connection point 212 located on an inner surface of flapper portion 203 of roller 126. Thus, flexible strap 210 is movable at first end 211 relative to the rotation of cam housing 206, and movable at second end 224 relative to pivotal movement of flapper portion 203.

Referring now to FIG. 6B, when roller 126 is further rotated in a counter-clockwise direction (relative to FIG. 6B) toward the fully-extended position of the covering, first support member 118 no longer lies over flapper portion 203, thereby allowing flapper portion 203 to pivot, under the influence of gravity, about pivot point 214, downward and away from main body portion 202. First end 211 of flexible strap 210 rotates proportionally with rotation of cam housing 206, while second end 224 of flexible strap 210 is pulled with the downward pivotal movement of flapper portion 203. However, because cam surface 209 of cam mechanism 208 remains stationary during rotation of roller 126, flexible strap 210 is pulled taut as flapper portion 203 pivots away from main body portion 202, which acts to limit the amount of pivotal movement of flapper portion 203. The amount of pivotable movement of flapper portion 203 depends upon the degree of rotation of roller 126. Subsequently, as the second support member 120 is coupled to flapper portion 203 at top end 205 near or substantially adjacent to connection point 212, continued rotation of roller 126 enables second support member 120 to laterally separate from first support member 120 in the direction of rear surface 152, thereby at least partially opening the plurality of vanes 112, as is illustrated in FIG. 6B.

Due to the relative rotational motion of cam housing 206 with respect to the pivotal motion of flapper portion 203, flexible strap 210 is able to control vertical movement of second support member 120 (and bottom rail 110) so as to maintain a substantially constant height of bottom rail 110 above surface 180 as roller 126 is rotated in a counter-clockwise direction to "open" the covering. Accordingly, while second support member 120 and bottom rail 110 do travel laterally toward rear surface 152 during counter-clockwise rotation, because the strap 210 becomes taut and prevents the flapper portion 203 (and, hence, the second support member connection point at rib 218) from further lowering, there is little to no vertical movement of bottom rail 110 during rotation, thereby avoiding and/or preventing unwanted gaps from forming between bottom rail 110 and surface 180.

Referring to FIG. 6C, covering system 300 is shown in a "fully-open" configuration, wherein the plurality of vanes 112 are held in a substantially horizontal orientation to allow light to pass therethrough. As described above with respect to FIG. 6B, flexible strap 210 coupled at the end of flapper portion 203 allows for controlled pivotal movement of flapper portion 203 as roller 126 is rotated in a counter-clockwise direction (relative to FIG. 6C). As will be set forth in further detail below, respective pivot joint ends 214, 215 on flapper portion 203 and main body portion 202 each include limit stops 234, 235 (shown in FIG. 5), which prevents flapper portion 203 from pivoting beyond a desired angular position, thereby also preventing any additional rotation of roller 126. When flapper portion 203 pivots to a point where these limit stops are engaged, flapper portion 203 has pivoted to its furthest open position relative to main body portion 202. However, because flapper portion 203 has opened outwardly and downwardly with respect to main body portion 202, and top end 205 of second support member 120 has moved proportionally outwardly and downwardly, second support member 120 and bottom rail 110 coupled thereto maintain a substantially constant height above surface 180 in the "fully-open" configuration of covering system 200, thereby preventing unwanted gaps from forming between bottom rail 110 and surface 180.

In addition to maintaining the vertical spacing between bottom rail 110 and surface 180 in the "fully-open" configuration, flapper portion 203 of roller 126 also enables additional lateral displacement between first support member 118 and second support member 120. As detailed above, with a conventional covering system and roller configuration, the lateral displacement between first and second support members would generally be limited to about the diameter of the roller itself, as the proximal ends of the respective support members are typically coupled along a surface of the cylindrical roller. However, in covering system 300, flapper portion 203, when pivoted into an open position and restricted by limit stops at respective pivot joint ends 214, 215, laterally extends the distance between the main body portion 202 of roller 126 and the top end 205 of second support member 120 by a distance B, as shown in FIG. 6C. Such additional lateral displacement between first support member 118 and second support member 120 which may act to pull vanes 112 into an increasingly horizontal position, which may affect the shape and aesthetic appearance of the vanes 112, and may permit for increased light entry and visibility therethrough, yet without altering the vertical spacing between bottom rail 110 and surface 180. By varying lateral spacing B and the size of the flapper portion, the length of the flexible strap, the materials of the vanes, and other factors, the shape and aesthetics of the covering may be altered.

The foregoing description has broad application. It should be appreciated that the concepts disclosed herein may apply to many types of covering panels or shades, in addition to those described and depicted herein. Similarly, it should be appreciated that the concepts disclosed herein may apply to many types of coverings, in addition to the coverings described and depicted herein. For example, the concepts may apply equally to a top rail or any other rail movable through a handle assembly. The discussion of any embodiment is meant only to be explanatory and is not intended to suggest that the scope of the disclosure, including the claims, is limited to these embodiments.

Those skilled in the art will recognize that the architectural covering and leveling mechanism has many applications, may be implemented in various manners and, as such is not to be limited by the foregoing embodiments and examples. Any number of the features of the different embodiments described herein may be combined into a single embodiment. The locations of particular elements, for example, the flapper portions, the track, the cam housing, the flexible strap, etc., may be altered. Alternate embodiments are possible that have features in addition to those described herein or may have less than all the features described. Functionality may also be, in whole or in part, distributed among multiple components, in manners now known or to become known.

It will be appreciated by those skilled in the art that changes could be made to the embodiments described above without departing from the broad inventive concept. It is understood, therefore, that this invention is not limited to the particular embodiments disclosed, but it is intended to cover modifications within the spirit and scope of the invention. While fundamental features have been shown and described in exemplary embodiments, it will be understood that omissions, substitutions, and changes in the form and details of the disclosed embodiments of the architectural covering and leveling mechanism may be made by those skilled in the art without departing from the spirit of the invention. Moreover, the scope of the invention covers conventionally known, and future-developed variations and modifications to the components described herein as would be understood by those skilled in the art.

In the claims, the term "comprises/comprising" does not exclude the presence of other elements, features, or steps. Furthermore, although individually listed, a plurality of means, elements, or method steps may be implemented by, e.g., a single unit, element, or piece. Additionally, although individual features may be included in different claims, these may advantageously be combined, and their inclusion individually in different claims does not imply that a combination of features is not feasible and/or advantageous. In addition, singular references do not exclude a plurality. The terms "a", "an", "first", "second", etc., do not exclude a plurality. Reference signs or characters in the disclosure and/or claims are provided merely as a clarifying example and shall not be construed as limiting the scope of the claims in any way.

Accordingly, while illustrative embodiments of the disclosure have been described in detail herein, it is to be understood that the inventive concepts may be otherwise variously embodied and employed, and that the appended claims are intended to be construed to include such variations, except as limited by the prior art.

The invention claimed is:

1. A covering system for an architectural feature, said covering system comprising:
- a rotatable roller having a main body portion and a pivotable flapper portion, wherein said flapper portion is pivotable relative to said main body portion;
- a first support member, wherein one end of said first support member is operatively coupled to said main body portion of said rotatable roller;
- a second support member, wherein one end of said second support member is operatively coupled to said pivotable flapper portion to facilitate pivoting of said pivotable flapper portion relative to said main body portion of said rotatable roller; and
- a limiting mechanism to interact with said pivotable flapper portion of said rotatable roller to restrict vertical movement and a vertical position of a bottom rail as said second support member is moved laterally with respect to the first support member,
  - wherein said limiting mechanism comprises a flexible strap having a first end and a second end, a first end of the flexible strap coupled to said pivotable flapper portion and the second end of the flexible strap coupled to a cam housing.

2. The covering according to claim 1, wherein an intermediate portion of said flexible strap passes over a cam surface of a non-rotatable cam mechanism.

3. The covering according to claim 2, wherein said cam housing is rotatably disposed about said non-rotatable cam mechanism.

4. The covering according to claim 1, wherein said cam housing is rotatable in conjunction with rotation of said rotatable roller.

5. The covering according to claim 1, wherein said flexible strap is configured to undergo tension to control an amount of angular movement of said pivotable flapper portion relative to said main body portion as said rotatable roller rotates.

6. The covering according to claim 1, wherein said pivotable flapper portion is outwardly pivotable relative to said main body portion of said rotatable roller via respective pivot joint ends on said pivotable flapper portion and said main body portion, wherein each respective pivot joint end comprises a gear portion.

7. The covering according to claim 6, further comprising a C-shaped bracket that at least partially surrounds each respective pivot joint end.

8. A covering system for an architectural feature, said covering system comprising:

a rotatable roller having a main body portion and a pivotable flapper portion, wherein said pivotable flapper portion is pivotable relative to said main body portion;

a first support member, wherein one end of said first support member is operatively coupled to said main body portion of said rotatable roller;

a second support member, wherein one end of said second support member is operatively coupled to said pivotable flapper portion to facilitate pivoting of said pivotable flapper portion relative to said main body portion of said rotatable roller;

a non-rotatable cam mechanism; and a flexible strap having a first end coupled to said pivotable flapper portion, wherein the non-rotatable cam mechanism and the flexible strap are configured to limit pivotable movement of the pivotable flapper portion with respect to the main body portion of the rotatable roller.

9. The covering according to claim 8, wherein said non-rotatable cam mechanism is disposed within said rotatable roller.

10. The covering according to claim 8, wherein the non-rotatable cam mechanism has at least one centrally-offset cam surface and an intermediate portion of said flexible strap passes over the at least one centrally-offset cam surface of the non-rotatable cam mechanism.

11. The covering according to claim 8, further comprising a cam housing rotatably disposed about said non-rotatable cam mechanism, wherein said cam mechanism is rotatable by said rotatable roller.

12. The covering according to claim 11, further comprising a second end of said flexible strap coupled to said cam housing.

13. The covering according to claim 8, wherein said pivotable flapper portion has a first pivot joint end comprising a gear portion, and said main body portion has a second pivot joint end comprising an opposing gear portion that interacts with respect to the gear portion of the first pivot joint end of the pivotable flapper portion to facilitate pivotable movement of the pivotable flapper portion with respect to the main body portion, and further comprising limit stops on each of the first pivot joint end and the second pivot joint end to limit the angular orientation of said pivotable flapper portion with respect to said main body portion.

14. A covering system for an architectural feature, said covering system comprising:

a rotatable roller having a main body portion and a pivotable flapper portion, wherein said pivotable flapper portion is pivotable relative to said main body portion;

a first support member, wherein one end of said first support member is operatively coupled with said main body portion of said roller;

a second support member, wherein said second support member is associated with said rotatable roller and operatively coupled with and laterally moveable relative to said first support member, wherein one end of said second support member is operatively coupled to said pivotable flapper portion of said rotatable roller;

a non-rotatable cam mechanism having at least one centrally offset cam surface, said non-rotatable cam mechanism disposed within said rotatable roller;

a cam housing rotatably coupled to said non-rotatable cam mechanism, wherein said cam housing is further operatively coupled with and rotatable by said rotatable roller; and a flexible strap having a first end and a second end, wherein the first end of said flexible strap is coupled to said cam housing and the second end of said flexible strap is coupled to said pivotable flapper portion of said rotatable roller.

15. The covering system of claim 14, wherein an intermediate portion of said flexible strap is configured to pass over said at least one centrally offset cam surface of said non-rotatable cam mechanism.

16. The covering system of claim 15, wherein said flexible strap is configured to undergo tension to control an amount of angular movement of said flapper portion relative to said main body portion as said roller rotates.

17. The covering system of claim 14, wherein said flapper portion is outwardly pivotable relative to said main body portion at respective pivot joint ends on said pivotable flapper portion and said main body portion, and further wherein said respective pivot joint ends form a gear joint.

18. A covering system for an architectural feature, said covering system comprising:

a rotatable roller having a main body portion and a pivotable flapper portion, wherein said flapper portion is pivotable relative to said main body portion;

a first support member, wherein one end of said first support member is operatively coupled to said main body portion of said rotatable roller;

a second support member, wherein one end of said second support member is operatively coupled to said pivotable flapper portion to facilitate pivoting of said pivotable flapper portion relative to said main body portion of said rotatable roller; and a limiting mechanism to interact with said pivotable flapper portion of said rotatable roller to restrict vertical movement and a vertical position of a bottom rail as said second support member is moved laterally with respect to the first support member, wherein said limiting mechanism comprises a track wall positioned laterally with respect to said rotatable roller and a pin that interacts with the track wall, wherein the pin extends laterally from said pivotable flapper portion and during pivotable movement of the pivotable flapper portion the pin contacts the track wall and is guided by the track wall to control an angular orientation of said pivotable flapper portion as said rotatable roller rotates.

19. The covering according to claim 18, wherein the track wall is configured to restrict vertical movement and vertical position of said pin.

* * * * *